April 16, 1935. R. C. BENNER ET AL Re. 19,531

METHOD OF RECOVERING SULPHUR

Original Filed March 2, 1926

INVENTORS
Raymond C. Benner
Alfred P. Thompson
BY Forbes Sibley
ATTORNEY

Reissued Apr. 16, 1935 Re. 19,531

UNITED STATES PATENT OFFICE 19,531

METHOD OF RECOVERING SULPHUR

Raymond C. Benner, Niagara Falls, N. Y., and Alfred Paul Thompson, Pittsburgh, Pa., assignors to General Chemical Company, New York, N. Y., a corporation of New York Original No. 1,771,480, dated July 29, 1930, Serial No. 91,675, March 2, 1926. Application for reissue July 13, 1932, Serial No. 622,282

25 Claims. (Cl. 23—226)

Figure 1:
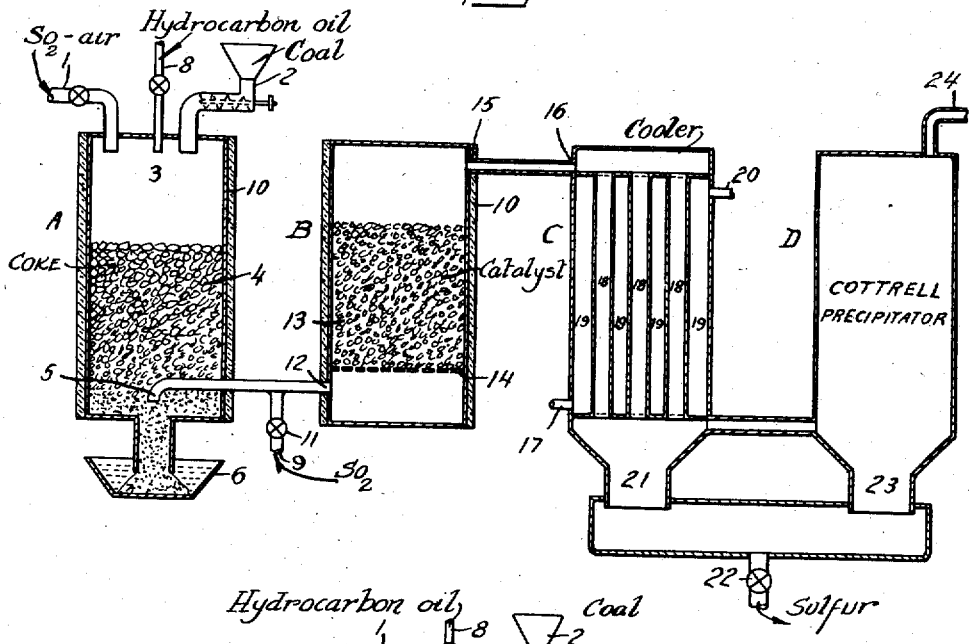
Figure 2:
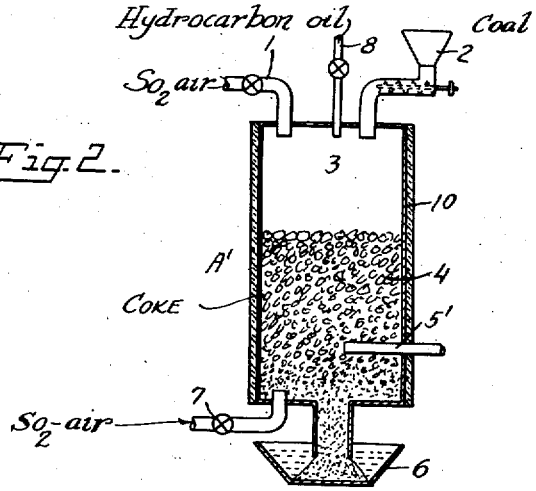

This invention relates in general to the reduction of sulphur dioxide gases to hydrogen sulphide or elemental sulphur.

The principal object of our invention is to provide a more efficient and economical process and apparatus for recovering sulphur in the elemental form from sulphur dioxide containing gases. The invention further contemplates the provision of an improved process for the reduction of sulphur dioxide gas to hydrogen sulphide. Another object is to provide a process for the reduction of sulphur dioxide by an operation involving utilization of flow-temperature coke which process may be carried out at lower temperatures with accompanying conservation of heat. Other and further objects will appear following a complete understanding of the invention.

In the reduction of sulphur dioxide containing gases to recover sulphur in the elemental form it has been a common practice to pass the gases over incandescent coke produced by ordinary high-temperature coking operations. In this process temperatures of 1000–1200° C. are required in order to obtain a commercially practical rate of reduction. Also it has been proposed to reduce sulphur dioxide containing gases by causing them to react with water gas or producer gas. In both of these processes it has been considered necessary that there should be a considerable amount of water vapor present, either by addition or formation, to prevent the formation of carbonyl sulphide with the resulting loss in sulphur. Accordingly it has been a common practice to add steam to the reaction thereby assuring the decomposition of the carbonyl sulphide which is likely to form. This requires additional heat which increases the cost of operation.

We have discovered that by causing the sulphur dioxide containing gases to first pass through a heated zone in which are present substantial amounts of hydrocarbons, and then subsequently passing the products of this zone through a bed of heated carbon, such as low-temperature coke, we are able to carry out the process of the reduction of the sulphur dioxide to elemental sulphur at substantially low temperatures and to obtain a rate of reduction considerably higher than has hitherto been considered possible. We have further discovered that these conditions can most conveniently and satisfactorily be produced by causing the sulphur dioxide to react with bituminous coal or coal which is high in volatile matter. As the bituminous coal enters the heated zone a coking operation takes place which liberates substantial amounts of hydrocarbons to initiate the reducing action, and which coking operation, because of the relatively low temperatures involved, as will hereinafter appear, results in the production of a low-temperature coke. Furthermore, this volatile matter serves to prevent the formation, or provides for the decomposition, as the case may be, of any carbonyl sulphide. Still another important advantage obtained by our preferred process is the production of a very active coke which is formed by the sudden coking of the bituminous coal in the process, which is available to serve as a catalytic agent for the reduction of the sulphur dioxide by the reducing gases present.

Our invention may be applied to the reduction of sulphur dioxide as it may occur in smelter gas, roaster gas, pyrites or burner gas, etc. In fact it is applicable to all gaseous mixtures wherein sulphur dioxide is present in appreciable amounts.

Certain advantages of our invention are obvious to one skilled in the art, as for example, economy of heat due to the lower temperature of reaction, elimination of the possible formation of the carbonyl sulphide, and availability, reduction in amount, and comparative cheapness of the fuel required. When operating with cold sulphur dioxide gas, it is necessary to raise the temperature of the gas to the reaction temperature by burning a portion of the fuel used with oxygen or air, or by providing other independent heating means. It will be seen that a lowering in the reaction temperature will lessen the amount of fuel required to be burned. We have found that the formation of carbonyl sulphide is effectively prevented when using bituminous coal, due probably to the presence of considerable amounts of hydrocarbons and hydrogen. The amount of fuel required is not only lessened, but the particular type of fuel which we have found most advantageous, i. e., bituminous coal, is comparatively cheap and much more available than other fuels, as anthracite coal. Other advantages will appear from the following description of our process.

Fig. I represents diagrammatically one general arrangement of apparatus for carrying out our novel process. Fig. II represents diagrammatically an alternative arrangement of the reduction chamber.

We will now describe the steps for carrying out our novel process. The sulphur dioxide containing gas is admitted at the top of a suitable reduction chamber A through the inlet 1. Bituminous coal in a granular or finely divided state is continuously fed in through a suitable feed mechanism 2. While the particular physical nature of the coal is not of especial importance, nevertheless it should be in such form as will facilitate uniform distribution and provide for rapid coking or carbonization. Sufficient air is admitted along with the sulphur dioxide gas to burn a portion of the combustible matter in order to maintain the required temperature in the chamber. We have discovered that a temperature of 700–800° C., depending upon the type of coal used, is sufficient for a rapid reduction of the sulphur dioxide and accordingly the air supply is restricted to maintain this temperature. At these relatively low temperatures, corresponding generally to the temperatures prevailing in low-temperature carbonization processes, a low-temperature coke is produced.

As the bituminous coal enters the heat reduction chamber there takes place in the zone 3, a sudden partial coking of the coal with the liberation of a large amount of volatile matter comprising chiefly hydrocarbons and free hydrogen. This sudden liberation of gaseous constituents of the coal produces a very porous coke which will later be more specifically referred to and its importance pointed out.

Sulphur dioxide gas entering through the inlet 1 encounters a strongly reducing atmosphere in the lower part of the zone 3 comprising solid particles of carbonaceous material, hydrocarbons and free hydrogen, and its reduction is commenced. The following reactions are typical of the reducing action which occurs in this part of the reduction chamber:

$$2C+SO_2=2CO+S$$
$$C+SO_2=CO_2+S$$
$$CH_4+2SO_2=CO_2+2H_2O+2S$$
$$3CH_4+4SO_2=3CO_2+2H_2O+4H_2S$$

The coke formed in the zone 3 falls to the bed 4. It is preferable that this coke bed 4 shall fill one-half to two-thirds of the reduction chamber. It is, however, not necessary to maintain a coke bed at such depth, a thinner bed serving as well, and we do not wish to limit ourselves to this particular arrangement. When using a deeper coke bed extending upwardly close to the top of the chamber, the entering coal may fall to the bed before substantial coking occurs. In this case the zone 3 containing hydrocarbons will be partially filled with a bed of coal undergoing coking.

The gaseous products formed in the upper zone 3, air, and the unreduced sulphur dioxide pass downwardly in cocurrent flow through the hot coke bed wherein the tar and soot driven off from the bituminous coal at the temperature employed, are consumed by the air and sulphur dioxide. This is of great importance as it prevents contamination with tar and soot of the products of the reduction chamber, which may be subsequently passed to a catalyzing chamber. The reactions commenced in the upper zone 3 of the reduction chamber are continued in the zone of the coke bed 4. As mentioned above, the coke composing the bed 4 is a very porous structure due to the conditions of its production which provide for sudden coking. We have found that this, as hereinbefore noted, low-temperature coke is very active in catalyzing the reducing action of the hydrocarbons, carbon monoxide, hydrogen sulphide, etc., upon the sulphur dioxide gas present. The rate of reduction of the sulphur dioxide in this zone is thereby greatly increased. The hot coke also serves as a reducing agent as in the known practice.

The gaseous products of the reduction chamber are removed at a point near the bottom of the coke bed through the outlet 5. The coke as it is burned to ash is removed at the bottom of the chamber through a water seal 6. The process is so carried on as to maintain a substantially constant depth of coke bed. By a proper regulation of air, sulphur dioxide, and coal, admitted to the chamber, it is possible to provide for substantially complete burning of the coke before it reaches the bottom of the reduction chamber and for maintaining the coke bed at a constant depth.

The products of the reduction chamber comprise chiefly sulphur vapor, hydrogen sulphide, sulphur dioxide, carbon monoxide, hydrocarbons, some carbon dioxide, and inert nitrogen. The amount of sulphur dioxide will ordinarily be quite small and frequently merely a trace. Practically no carbonyl sulphide is to be found in the exit since the formation of this objectionable substance is prevented by the large amounts of hydrocarbons and free hydrogen present during the reduction reactions. The relative amount of hydrogen sulphide produced in the reaction may be varied by controlling the temperature of the reduction chamber, the rate of admission of the sulphur dioxide gas, the amount of volatile matter occurring in the charge, etc.; an increase in the amount of volatile matter, in temperature of chamber, or a decrease in the rate of admission of $SO_2$ resulting in an increase in the amount of $H_2S$. Complete reduction of the sulphur dioxide may be obtained at a lower temperature and with higher gas speed, that is with an increased rate of reduction, with bituminous coal higher in volatile matter than with those lower in volatile matter. This may be due to the larger amount of hydrocarbons and free hydrogen liberated in the coking process and possibly to the volatile matter content of the resulting low-temperature coke, or possibly to the greater porosity of the coke produced with resulting increased surface effect. Accordingly we prefer to use bituminous coals which are high in hydrocarbons, as for example, coal containing from 25–60% of volatile matter.

However, when for economic reasons or otherwise it is necessary to use coals lower in volatile matter than is otherwise desirable, we overcome this undesirable condition by the addition of petroleum or hydrocarbon oils. These may be admitted at the top of the reduction chamber along with the coal or through a separate inlet 8. The coal when coked serves to maintain the coke bed and the hydrocarbons and free hydrogen derived both from coking and from the hydrocarbon oils serve to reduce the sulphur dioxide gas and prevent the formation of the objectionable carbonyl sulphide.

The alternative construction of the reduction chamber A′ as shown in Fig. II provides for the removal of the products of the reduction through the outlet 5′ at a point well below the top of the coke bed yet somewhat above the ash discharge. Also it provides an inlet 7 at the bottom of the chamber and below the coke bed whereby sulphur dioxide gas and a limited amount of air may be admitted to the chamber in addition to that air and sulphur dioxide entering through the inlet 1. The sulphur dioxide and air pass upward toward the outlet 5′, counter-current to the falling coke and insure the complete combustion of the coke before it reaches the ash discharge. The burning serves to provide heat for the reduction chamber. The supply of air is limited as to just maintain the required temperature conditions. Any carbon monoxide gas formed in this part of the chamber serves as a reducing agent for the sulphur dioxide in the subsequent catalyst chamber.

As heretofore referred to, the products of the reduction chamber comprise sulphur, in the form of hydrogen sulphide and some unreduced sulphur dioxide (ordinarily quite small in amount), as well as a large amount of sulphur vapor. Also there are present reducing gases, as for example, carbon monoxide and hydrocarbons. It is therefore desirable to complete the reaction between any reducing agents present and sulphur dioxide whereby elemental sulphur is produced. As previously pointed out, by a proper control of the reaction in the reduction chamber, the amount of hydrogen sulphide produced may be regulated. Regulation is preferably such that in the exit gas from the reduction chamber there is at least sufficient reducing gas (hydrogen sulphide, hydrocarbons, carbon monoxide, etc.), to reduce the sulphur dioxide present. We have found it to be quite advantageous to provide an inlet 9 with a control valve 11 whereby some additional sulphur dioxide gas mixture may be introduced into the stream of products from the reduction chamber. The advantage of introducing sulphur dioxide instead of air is that the excess reducing gas is then utilized in reducing sulphur dioxide to elemental sulphur, rather than in merely reacting with free oxygen. When the amount of reducing gases is in excess of that indicated above, sulphur dioxide is admitted in this way in such amounts as to provide at least sufficient reducible gas to react with the hydrogen sulphide and carbon monoxide from the reduction chamber. While it is most desirable to introduce sulphur dioxide gas at this point, it is of course clear that any oxidizing gas, as for example air, may be employed for the oxidation of the hydrogen sulphide to elemental sulphur. The gas mixture is then passed through the inlet 12 into a chamber B. This chamber is provided with a suitable catalyst 13 supported upon a grid 14 for increasing the rate of reduction of the sulphur dioxide and the reactions commenced in the reduction chamber are completed. The following equations are typical of what may occur:

$$2H_2S+SO_2=2H_2O+3S$$
$$2CO+SO_2=2CO_2+S$$
$$CH_4+2SO_2=CO_2+2H_2O+2S$$

The temperature of the catalyst chamber is maintained by the heat of the gas from the reduction chamber and heat of reaction of the sulphur dioxide with the reducing gases. This temperature may be about 500° C., but the specific temperature of such chamber is not of importance except that it should be above that temperature at which the elemental sulphur formed will condense and be retained and below that temperature where excessive interaction of sulphur and water vapor occurs to form sulphur dioxide and hydrogen sulphide.

Any of the well-known catalysts for aiding the reduction of sulphur dioxide may be employed. We have found, however, that particularly good results are obtained when using bauxite, a natural occurring oxide of aluminum, usually contaminated with iron oxide and small amounts of other impurities. Of the various types of bauxite, that variety commonly known as French bauxite has been found to be particularly useful because of its resistance to disintegration. A typical analysis of the bauxite which we have found to be satisfactory is as follows:

| | Per cent |
|---|---|
| Total alumina ($Al_2O_3$) | 57.16 |
| Total ferric oxide ($Fe_2O_3$) | 4.87 |
| Silicon dioxide ($SiO_2$) | 19.62 |
| Titanium oxide ($TiO_2$) | 3.11 |
| Calcium oxide (CaO) | 0.45 |
| Magnesium oxide (MgO) | 0.51 |
| Loss on ignition | 13.95 |

The exit gases from the catalyst chamber carry substantially all of the sulphur in the form of sulphur vapor. These gases leaving the catalyst chamber through the outlet 15 are passed to a condenser C through the inlet 16 and through the tubes 18. The cooling medium may be introduced through the inlet 17, circulated about the tubes 18 in the space 19 and removed through the outlet 20. This condenser may assume the form of a waste heat boiler if it is so desired. The temperature of the gases is reduced to about 150° C. and a greater part of the sulphur vapor is condensed and runs out at the bottom 21 of the condenser to a suitable molten sulphur discharge 22.

To remove completely the sulphur vapor remaining in the gases we have found it advantageous to pass the gases through a Cottrell apparatus whereby the sulphur is electrically precipitated. However, it is to be understood that other means, as scrubbers, employing calcium chloride salt solution, absorption in oil, etc., may be alternatively employed. The sulphur condensed in the Cottrell precipitator D likewise runs out through the bottom 23 thereof to the molten sulphur discharge 22. The temperature of the molten sulphur issuing from the condenser C and Cottrell D will ordinarily be sufficiently high that the sulphur will not congeal but will readily run out through the discharge 22. It may however become necessary at times to maintain the collected sulphur fluid by externally applied heat. The sulphur free gases escape through the outlet 24.

It will be clear that suitable heat insulation should be provided for those parts of the apparatus in which it is desired to conserve heat. For this purpose we have shown the reduction chamber A and catalyst chamber B surrounded by lagging 10. By enabling the reduction to be carried out at reduced temperatures, and by providing for conservation of the heat produced by the reaction, we are enabled to effect the reduction of the sulphur dioxide gases with a minimum of fuel and thus lower considerably the cost of the operation.

As previously explained, the gaseous products from the reduction chamber contain varying amounts of hydrogen sulphide depending upon the regulation of the operating conditions. In many cases where hydrogen sulphide gas is desired the products of the reduction chamber, containing considerable quantities of this gas, may be withdrawn and utilized directly or following a suitable purification treatment to remove undesirable impurities. Thus our method provides a rapid and efficient process for the production of hydrogen sulphide from sulphur dioxide gases.

It is to be understood that the terms "air" or "oxygen" as used in the specification and claims are intended to cover the use of any suitable gas containing oxygen, as air, commercial oxygen or oxygen enriched air.

Various modifications may be made in our proposed process without departing from the spirit of the invention and we do not wish to limit the scope thereof except as defined in the appended claims.

We claim:

1. A process for the recovery of sulphur from sulphur dioxide containing gases which comprises the steps of introducing sulphur dioxide gas into a reducing zone comprising solid particles of carbonaceous material and a substantial amount of hydrocarbons, maintaining the temperature of this zone at about 700–800° C. by the oxidation of a portion of the combustible matter with a limited amount of oxygen, passing the gaseous products of the zone through an incandescent bed of coke produced by the sudden coking of bituminous coal, to continue the reduction, withdrawing the products from said coke bed, adding sulphur dioxide gas to the mixture to provide at least sufficient reducible gas to react with the hydrogen sulphide and carbon monoxide present, and passing the resulting mixture over bauxite maintained at a temperature above that at which the elemental sulphur produced will be retained by said bauxite.

2. A process for the reduction of sulphur dioxide containing gases which comprises the steps of introducing sulphur dioxide gas into a heated reducing zone comprising solid particles of carbonaceous materal and a substantial amount of hydrocarbons, maintaining the temperature of this zone by a partial combustion of the combustible matter with a limited amount of oxygen, passing the gaseous products of this zone through a zone of incandescent coke produced by the sudden coking of bituminous coal, to continue the reduction of the sulphur dioxide, and passing the products from the zone of coke over a suitable catalyst to complete the reduction.

3. A process for the reduction of sulphur dioxide containing gases which comprises the steps of introducing sulphur dioxide gas into a heated reducing zone comprising solid particles of carbonaceous material and a substantial amount of hydrocarbons, maintaining the temperature of this zone by a partial combustion of the combustible matter with a limited amount of oxygen, passing the gaseous products of this zone through a zone of incandescent coke produced by the sudden coking of bituminous coal, to continue the reduction of the sulphur dioxide, and passing the products from the zone of coke over bauxite to complete the reduction.

4. A process for the reduction of sulphur dioxide containing gases which comprises the steps of introducing sulphur dioxide gas into a heated reducing zone comprising substantial amounts of hydrocarbons, passing the products of this zone through a zone of incandescent coke produced by sudden coking of bituminous coal, to continue the reduction, and passing the products of this latter zone over a catalyst to complete the reduction.

5. A process for the reduction of sulphur dioxide containing gases which comprises the steps of introducing sulphur dioxide gas into a heated reducing zone comprising solid particles of carbonaceous material and a substantial amount of hydrocarbons, passing the products of this zone through a zone of incandescent coke produced by sudden coking of bituminous coal to continue the reduction of the sulphur dioxide, adding sulphur dioxide gas to the products of the latter zone to provide at least sufficient reducible gas to react with the hydrogen sulphide and carbon monoxide present, and passing the mixture over a suitable catalyst for completing the reduction.

6. A process for the reduction of sulphur dioxide containing gases which comprises introducing sulphur dioxide gas into a heated reducing zone comprising solid particles of carbonaceous material high in volatile matter, and passing the products of this zone through incandescent coke thereby producing elemental sulphur.

7. A process for the reduction of sulphur dioxide containing gases which comprises the steps of introducing sulphur dioxide gas into a heated reducing zone comprising solid particles of carbonaceous material high in volatile matter, passing the products of this zone first through incandescent coke to continue the reduction and finally over a suitable catalyst to complete the reaction of any sulphur dioxide with the reducing gases present to produce elemental sulphur.

8. A process for the recovery of sulphur from sulphur dioxide containing gases which comprises simultaneously introducing sulphur dioxide gas and solid carbonaceous material high in volatile matter into a heated zone, admitting only sufficient air or free oxygen with the sulphur dioxide gas to maintain the temperature of the zone at about 700–800° C., passing the gaseous products of the zone downwardly through a bed of incandescent coke maintained by the coking of the solid carbonaceous material, and subsequently passing the gaseous products of the reducing reaction over a catalyst to complete the reduction of the sulphur dioxide to elemental sulphur.

9. A process for recovery of sulphur from sulphur dioxide containing gases which comprises simultaneously introducing sulphur dioxide gas and bituminous coal into a heated zone, admitting only sufficient air or free oxygen with the sulphur dioxide gas to maintain the temperature of the zone at about 700–800° C., passing the gaseous products of this zone downwardly through a bed of incandescent coke continually renewed by the fresh coke produced in the zone above, and subsequently passing the products of reduction over bauxite to complete the reduction of the sulphur dioxide to elemental sulphur.

10. A process for the reduction of sulphur dioxide containing gases which comprises simultaneously introducing sulphur dioxide gas and bituminous coal into a heated zone, whereby the coal is suddenly coked and the reduction of the sulphur dioxide by the hydrocarbons or free hydrogen liberated is commenced, maintaining the desired temperature of said zone by the oxidation of a portion of the combustible matter with a limited amount of oxygen, passing the gaseous products of the zone downwardly through a bed of incandescent coke continually renewed by the fresh coke formed in the zone above, withdrawing the gaseous products from the coke bed, and subsequently catalyzing the reduction of the sulphur containing gaseous compounds to yield elemental sulphur.

11. A process for the reduction of sulphur dioxide containing gases which comprises simultaneously introducing sulphur dioxide gas and bituminous coal into a heated zone, whereby the coal is suddenly coked and the reduction of the sulphur dioxide by the hydrocarbons or free hydrogen liberated is commenced, maintaining the desired temperature of said zone by the oxidation of a portion of the combustible matter with a limited amount of oxygen, passing the gaseous products of the zone downwardly through a bed of incandescent coke continually renewed by the fresh coke formed in the zone above, introducing a limited amount of oxygen below the bed of coke and passing it upwardly, removing the gaseous products of both the upward and downward gas stream at a point intermediate the top and bottom of the coke bed, and passing said products over a catalyst to complete the reduction.

12. In a process for the reduction of sulphur dioxide containing gases, the steps of simultaneously introducing sulphur dioxide gas and bituminous coal into a heated zone whereby the coal is subjected to sudden coking and the reduction of the sulphur dioxide by the volatile hydrocarbons and free hydrogen is commenced and passing the gaseous products of the zone downwardly through an incandescent bed of coke continually renewed by the fresh coke produced in the zone above.

13. In a process for the reduction of sulphur dioxide containing gases, the steps of simultaneously introducing sulphur dioxide gas and bituminous coal into a heated zone whereby the coal is subjected to sudden choking and the reduction of the sulphur dioxide by the volatile hydrocarbons and free hydrogen is commenced, and passing the gaseous products of this zone downwardly into an incandescent bed of coke continually renewed by the fresh coke produced in the zone above, introducing a limited quantity of oxygen below the bed of coke and passing said oxygen upwardly and removing the gaseous products of both gas streams at a point intermediate the top and bottom of the coke bed.

14. In a process for the reduction of sulphur dioxide containing gases, the steps of simultaneously introducing sulphur dioxide gas, coal and hydrocarbon oil into a heated zone whereby the coal is subjected to sudden coking and the reduction of the sulphur dioxide by the volatile hydrocarbons and free hydrogen is commenced, and passing the gaseous products of this zone downwardly through an incandescent bed of coke continually renewed by the fresh coke produced in the zone above.

15. In a process for the reduction of sulphur dioxide containing gases, the steps of simultaneously introducing sulphur dioxide gas, coal and hydrocarbon oil into a heated zone whereby the coal is subjected to sudden coking and a reduction of the sulphur dioxide by the volatile hydrocarbons and free hydrogen is commenced, passing the gaseous products of this zone downwardly into an incandescent bed of coke continually renewed by the fresh coke produced in the zone above, introducing a limited quantity of oxygen below the bed of coke and passing said air upwardly, and removing the gaseous products of both gas streams at a point intermediate the top and bottom of the coke bed.

16. In a process for the reduction of sulphur dioxide gases, the steps of introducing sulphur dioxide gas, coal, and a material containing substantial amounts of hydrocarbons into a heated zone, and passing the gaseous products of this zone through a bed of incandescent coke.

17. In a process for the reduction of sulphur dioxide gases, the steps of continuously introducing sulphur dioxide gas and particles of bituminous coal into a heated zone, and passing the gaseous products of said zone through a bed of incandescent coke maintained by the coke produced from said coal.

18. In a process for the reduction of sulphur dioxide gases, the steps of continuously introducing sulphur dioxide gas and particles of bituminous coal into a heated zone, maintaining the desired temperature of said zone by the admission of sufficient quantites of oxygen, passing the gaseous products of said zone through a bed of incandescent coke, and passing the gaseous products from said coke bed in contact with a catalyst to produce elemental sulphur.

19. In a process for the production of elemental sulphur, the steps of introducing sulphur dioxide gas and a solid carbonaceous material high in volatile matter into a heated zone, maintaining the desired temperature in said zone by the admission of sufficient quantities of air, passing the gaseous products of said zone through a bed of incandescent coke, admitting sufficient sulphur dioxide gas into the gases leaving the coke bed to maintain a ratio by volume of sulphur dioxide to hydrogen sulphide at least one to two, and subsequently passing said gases in contact with a catalyst to produce elemental sulphur.

20. In a process for the reduction of sulphur dioxide gases, the steps which comprise introducing sulphur dioxide and bituminous coal into a reaction chamber, maintaining said chamber at a temperature sufficiently high to initiate the reduction of the sulphur dioxide and to coke said coal and subsequently passing the gaseous reaction products in contact with a catalyst, whereby the reduction is completed.

21. In a process for the reduction of sulphur dioxide gases, the steps which comprise introducing sulphur dioxide and bituminous coal into a reaction chamber, maintaining said chamber at approximately 700–800° C., and subsequently passing the gaseous reaction products in contact with a catalyst, whereby the reduction is completed.

22. In a process for the reduction of sulphur dioxide gases by means of solid carbonaceous fuel, the steps of first contacting sulphur dioxide gas with carbonaceous fuel in co-current flow and subsequently contacting said carbonaceous fuel with an oxidizing gas in counter-current flow.

23. A process for the recovery of sulphur from sulphur dioxide containing gases, which comprises introducing sulphur dioxide gas and solid carbonaceous material high in volatile matter into a heated zone, passing the gaseous products of the zone through a bed of incandescent coke, and subsequently passing the gaseous products of the reducing reaction over a catalyst to complete the reduction of sulphur dioxide to elemental sulphur.

24. In the process for the reduction of sulphur dioxide, the improvement which comprises introducing carbonizable coal into the reduction zone, carbonizing the coal at temperatures not substantially in excess of about 800° C. and reducing sulphur dioxide by contacting the same at reactive temperatures in the reaction zone with the carbonized coal.

25. In the process for the reduction of sulphur dioxide, the improvement which comprises introducing carbonizable coal into the sulphur dioxide reduction zone, utilizing heat of the reduction zone to carbonize the coal, maintaining the temperature in the reduction zone such as to effect carbonization of the coal at relatively low temperatures to produce a low-temperature coke, and reducing sulphur dioxide by contacting the same at reactive temperatures in the reduction zone with the low-temperature coke.

RAYMOND C. BENNER.
ALFRED PAUL THOMPSON.